N. CLARK.
Improvement in Corn-Planters.

No. 132,355.            Patented Oct. 22, 1872.

WITNESSES
William Edson
Frank G. Parker

INVENTOR
Nelson Clark.

UNITED STATES PATENT OFFICE.

NELSON CLARK, OF ROCHESTER, MASSACHUSETTS.

IMPROVEMENT IN CORN-PLANTERS.

Specification forming part of Letters Patent No. 132,355, dated October 22, 1872.

*To all whom it may concern:*

Be it known that I, NELSON CLARK, of Rochester, in the county of Plymouth and State of Massachusetts, have invented a certain new and useful Improvement in Corn and Seed Planters, of which the following is a complete specification:

Nature and Object of the Invention.

The nature of my invention consists in combining with the axle, which may be of any desired length, two parallel bars or rods, one of which has longitudinal motion, and acts as a communicator of motion from a face-cam on one of the side wheels to the several seed-distributing disks, each disk having its seed-hopper and other adjuncts, the number of seed-droppers being governed by the kind of work to be performed. The other parallel bar acts as a rocker-shaft, and communicates motion from a hand-lever to a series of toggles, and through these to the drill-formers and covering devices, which agree in number and position with the seed-droppers. My invention also covers certain mechanical devices, which may be best understood by reference to the full description. The object of my invention is to provide a machine for sowing seeds that shall be certain in its action and capable of being adjusted so as to sow simultaneously any desired number of rows, and at desired intervals between rows and between hills.

General Description.

Figure 1:
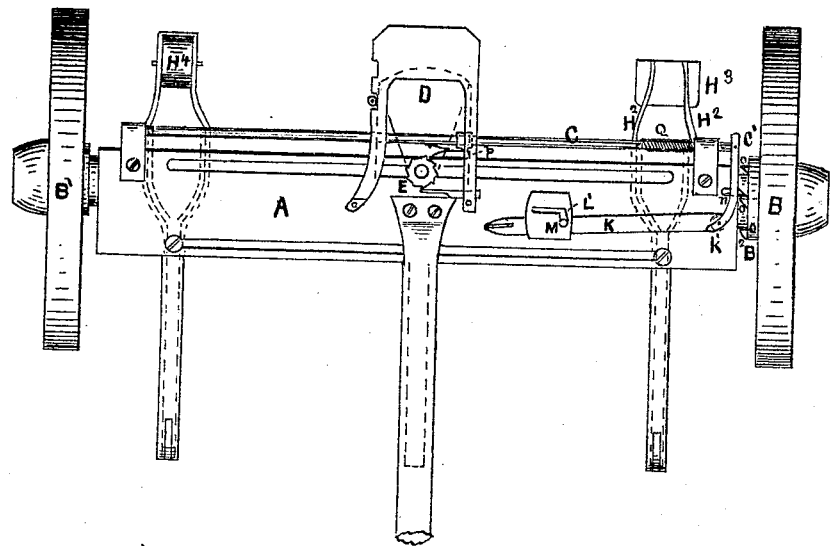
Figure 1 is a plan of my invention, in which I show but one complete dropping device, it not being necessary to show the others, as they are all alike.
Figure 4:
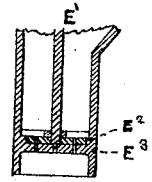
Fig. 4 is a vertical section through the lower end of the seed-hopper, showing the distributing device.
Figure 5:
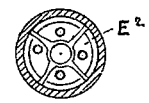
Fig. 5 is a plan of the distributing-disk.
Figure 2:
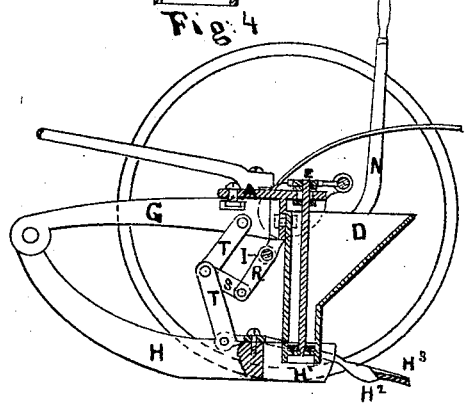
Fig. 2 is a vertical section through one of the seed boxes or droppers and the drill forming and covering device.
Figure 3:
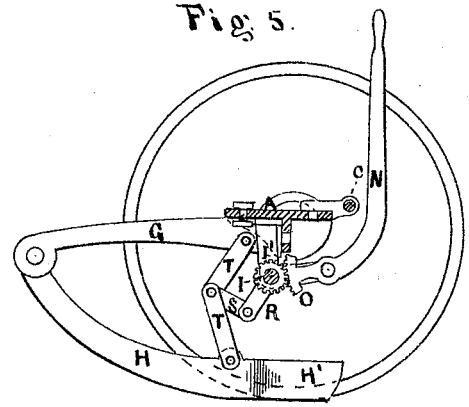
Fig. 3 is a vertical section, showing the device for lifting the drill-forming device.

A in Figs. 1, 2, and 3 represents the body of the machine, to the ends of which the main wheels B and $B^1$ are attached, as shown in Fig. 1. D, Figs. 1 and 2, represents one of the seed-hoppers. The seed-hoppers and their adjuncts may vary in position and number, the same being made adjustable at will. I have only shown one complete one, as they are to be all alike. C is a rod attached to the body A, and arranged to slide longitudinally, the motion being communicated to it by the face-cam $B^2$. $C'$ is a lever, pivoted at $K'$ at the end of the holding-bar K, Fig. 1, the end of $C'$ resting upon the end of the rod C. The lever $C'$ has an inclined lug, $n$, on it, which is acted upon by the cam-points $o\ o\ o$ of the cam-wheel $B^2$. This action gives motion to the rod $C'$, the counter motion being derived from a spring, Q. To the rod C a pawl, $p$, is attached, which engages with the ratchet-wheel E and turns it a part revolution at every motion. The wheel E, in its turn, communicates motion, through the shaft $E^1$, to the distributing-disk $E^2$, Figs. 2 and 4. The distributing-disk $E^2$ rests upon a delivering-disk, $E^3$, both disks being provided with the same number of holes or seed-receptacles, the same being arranged so that all of the holes coincide and thus let the seeds drop at each motion given to the disk $E^2$. The size and number of the holes or seed-receptacles in the disks $E^2$ $E^3$ are to be varied to suit the work to be done. When it is desirable to throw the seed-dropping device out of gear I have simply to move the holding-rod K so as to relieve the pin M from the notch $L'$. This will allow the lever $C'$ to fall back, so that the lug $n$ will not be acted upon by the cam-points $o\ o\ o$. I, Figs. 2 and 3, is a rocker-shaft, hung immediately under the body of the machine. This shaft has upon it a pinion-gear, $I'$, Fig. 3. N is a lever, having at its lower end a segment-gear, O, which, engaging with the pinion $I'$, gives it and the rocker-shaft I a rocking motion. The function of the rocker-shaft I will be explained below. G is an arm extending from the body A, and has pivoted at its outer extremity the drill-former H. This drill-former is forked at its ground end, as indicated by the dotted lines $H^1$ $H^1$ in Fig. 1, so as to form a kind of a plow for throwing up the earth to form the drill. Between the forks $H^1$ $H^1$ of the plow the seeds are distributed. At the rear end of each plow I attach the covering device $H^2$ $H^2$ $H^3$, Figs. 1 and 2. This consists of two blades, $H^2$ $H^2$, which serve to draw the earth back over the seeds, and of a leveler, $H^3$. If desirable, a roller may be substituted for the leveler H³, as shown at H⁴, Fig. 1. The plow H is hung to the arm G by the toggle-pieces T T, Fig. 3, this toggle being connected to the lever R on the rocker-shaft I by the link S, so that by moving the rocker-shaft, which may be done by the lever N, the plow may be thrown up or let down at will.

From the above description it will be seen that my communicators of motion are longitudinal and run the entire length of the machine, receiving the motion at one point and imparting it at any desired point, and simultaneously at any number of points. The first of these communicators—the rod C—serves to give motion to the seed-distributers, any number of which may be connected with it in the same manner as is shown at E, E¹, &c., as has already been described. The second communicator of motion, I, serves to receive motion from the hand-lever N, and imparts it, through the device R S T, to the plows H, as has been described. This shaft I, if round, should have a key-way, so that levers like R may be attached at any point; or the shaft may be square or octagonal and the lever R held by the shape of the shaft. In any case set-screws should be used to hold these levers R longitudinally in place.

I claim as my invention—

1. The longitudinal actuating-rod C, in combination with the lever C', adjustable stud $n$, cam B² $o\ o\ o$, and pawl and ratchet E, substantially as described, and for the purpose set forth.

2. The combination of the lever N, the segment-gear O, wheel I, arm R, link S, toggles T T, and plow H, substantially as described, and for the purpose set forth.

NELSON CLARK.

Witnesses:
 FRANK G. PARKER,
 WILLIAM EDSON.